United States Patent
Laws et al.

(10) Patent No.: US 9,435,978 B1
(45) Date of Patent: Sep. 6, 2016

(54) WATER-RESISTANT OPTICAL FIBER CABLES

(71) Applicant: Superior Essex Communications LP, Atlanta, GA (US)

(72) Inventors: Jeffrey Scott Laws, Brownwood, TX (US); Christopher W McNutt, Woodstock, GA (US)

(73) Assignee: Superior Essex Communications LP, Atlanta, GA (US)

( * ) Notice: Subject to any disclaimer, the term of this patent is extended or adjusted under 35 U.S.C. 154(b) by 684 days.

(21) Appl. No.: 13/916,242

(22) Filed: Jun. 12, 2013

Related U.S. Application Data

(60) Provisional application No. 61/659,669, filed on Jun. 14, 2012.

(51) Int. Cl.
*G02B 6/44* (2006.01)

(52) U.S. Cl.
CPC ........... *G02B 6/4494* (2013.01); *G02B 6/4479* (2013.01)

(58) Field of Classification Search
None
See application file for complete search history.

(56) References Cited

U.S. PATENT DOCUMENTS

| | | | |
|---|---|---|---|
| 4,711,523 A | 12/1987 | Iri et al. | |
| 4,913,517 A | 4/1990 | Arroyo et al. | |
| 5,039,197 A | 8/1991 | Rawlyk | |
| 5,112,726 A | 5/1992 | Cohen et al. | |
| 5,131,064 A | 7/1992 | Arroyo et al. | |
| 5,133,034 A | 7/1992 | Arroyo et al. | |
| 5,373,100 A | 12/1994 | Arroyo et al. | |
| 5,389,471 A * | 2/1995 | Kung ............... | H01M 2/162 429/206 |
| 5,698,615 A | 12/1997 | Polle | |
| 5,762,847 A | 6/1998 | Kamps et al. | |
| 6,326,551 B1 | 12/2001 | Adams | |
| 6,380,298 B2 | 4/2002 | Flautt et al. | |
| 6,658,185 B2 | 12/2003 | Bosisio et al. | |
| 6,692,611 B2 | 2/2004 | Oxman et al. | |
| 6,922,512 B2 | 7/2005 | Nechitailo | |
| 7,254,303 B2 | 8/2007 | Parsons | |
| 7,646,953 B2 | 1/2010 | Dowd et al. | |
| 7,751,666 B2 * | 7/2010 | Parsons ............... | G02B 6/4494 385/100 |
| 8,135,252 B2 | 3/2012 | Overton et al. | |
| 8,195,018 B2 | 6/2012 | Overton et al. | |
| 8,369,668 B1 * | 2/2013 | McNutt ............... | G02B 6/4479 385/109 |
| 2003/0118295 A1 | 6/2003 | Lail et al. | |
| 2004/0076386 A1 | 4/2004 | Nechitailo | |
| 2004/0120663 A1 * | 6/2004 | Lail ..................... | G02B 6/4429 385/100 |
| 2004/0134604 A1 | 7/2004 | Oxman et al. | |
| 2005/0089285 A1 * | 4/2005 | Bocanegra .......... | G02B 6/4411 385/114 |
| 2006/0133748 A1 * | 6/2006 | Seddon ............... | G02B 6/4422 385/102 |
| 2006/0193570 A1 | 8/2006 | Brown | |
| 2006/0234052 A1 | 10/2006 | Flautt et al. | |
| 2008/0056649 A1 * | 3/2008 | Fulbright .............. | G02B 6/443 385/100 |
| 2008/0219627 A1 * | 9/2008 | Puzan .................. | G02B 6/4494 385/109 |
| 2009/0003780 A1 * | 1/2009 | Bringuier ............ | G02B 6/4494 385/113 |

FOREIGN PATENT DOCUMENTS

GB    2193594 A  *  2/1988  ........... H01B 7/2855

* cited by examiner

*Primary Examiner* — Tina Wong

(57) ABSTRACT

Water-resistant optical fiber cables and associated methods for forming water-resistant optical fiber cables are provided. A cable may include an outer jacket that defines a cable core. At least one optical fiber may be positioned within the cable core and encapsulated within a suitable sheath, such as a buffer tube. Additionally, a plurality of discrete water swellable fibers may be loosely positioned within the cable to provide water-resistance for the at least one optical fiber.

20 Claims, 5 Drawing Sheets

WATER-RESISTANT OPTICAL FIBER CABLES

CROSS-REFERENCE TO RELATED APPLICATION

This application claims priority to U.S. Provisional Application No. 61/659,669, filed Jun. 14, 2012, and entitled "Water-Resistant Cables," the entire contents of which are incorporated by reference herein.

TECHNICAL FIELD

Embodiments of the disclosure relate generally to optical fiber cables and, more particularly, to optical fiber cables incorporating water-resistant material.

BACKGROUND

A wide variety of different types of cables are utilized to transmit power and/or communications signals. In certain applications, it is desirable to provide a moisture barrier in order to provide protection to internal components of a cable. For example, in cables containing one or more optical fibers, a moisture barrier is typically provided to reduce moisture penetration that can weaken or destroy the fibers. In a typical implementation, an optical fiber cable includes a sheath, such as a buffer tube, that provides protection to optical fibers situated therein, and a moisture barrier is incorporated into the buffer tube. Different types of moisture barriers have been utilized in association with conventional optical fiber cables. One conventional technique is to fill a cable or buffer tube with a fluid or a gel intended to block moisture incursion and to absorb mechanical shock; however, such fluids and gels are typically messy and difficult to process in both a manufacturing environment and during field service operations. Other conventional techniques include the placement of water absorbent chemicals into the cable. In some approaches, the water absorbent chemicals can be mixed with a fluid or gel; however, the mixture suffers from the same drawbacks as those discussed above for the fluid or gel.

In other cases, water absorbent materials are applied to the surface of a tape, yarn, or other substrate that is inserted into the cable, for example, in an essentially lengthwise or helical manner. Tapes can be made of materials such as polyester, polyolefin, metal, composite, or foamed elastomer. The tape or yarn functions as a transport medium for water absorbent or water swellable materials. However, currently available tapes and yarns often include materials that increase overall tensile strength and facilitate application of the tapes or yarns. As a result, these tapes and yarns add additional cost and size (e.g., diameter) to cables, often have limitations in processing length, and create material handling issues. Additionally, a tape or yarn is typically required to be incorporated along the full length of a cable during assembly. Accordingly, there is an opportunity for improved water-resistant optic fiber cables and associated techniques for forming water-resistant optical fiber cables.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
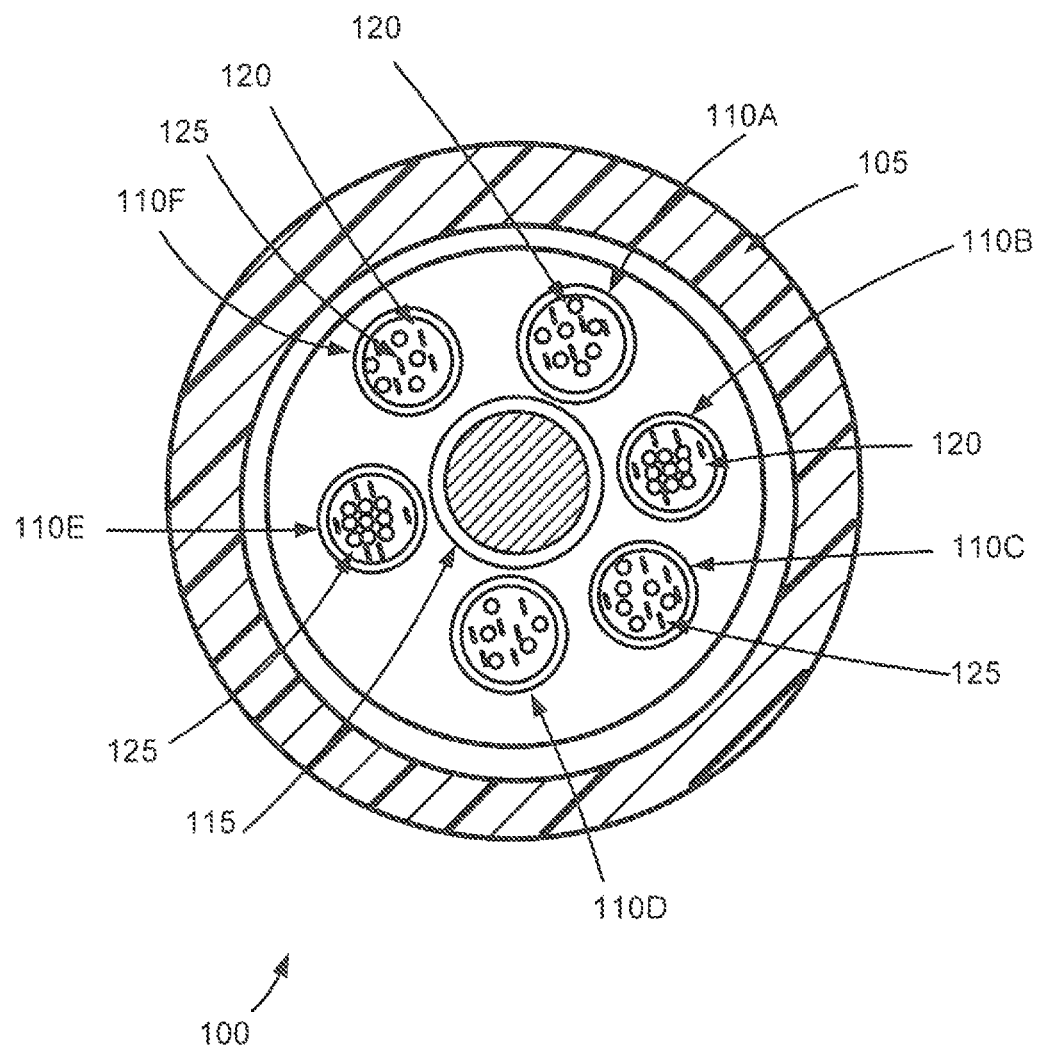
FIG. 1 is a cross-sectional view of an example water-resistant optical fiber cable, according to an illustrative embodiment of the disclosure.

Various embodiments of the present disclosure are directed to cables that incorporate relatively loose or discrete water swellable materials, such as super absorbent water swellable fibers, to provide water resistance and/or moisture penetration resistance. For example, sodium polyacrylate water swellable fibers may be utilized in a cable to provide water resistance for one or more transmission media, such as optical fibers, twisted pair conductors, etc. In certain embodiments, the swellable or absorbent materials may be incorporated into one or more optical fiber cables. For example, swellable materials may be incorporated into one or more buffer tubes or other sheaths utilized in a fiber optic cable.

According to an aspect of the disclosure, discrete water swellable materials may be loosely incorporated into a cable. For example, separate water swellable fibers may be incorporated into a cable. In certain embodiments, the water swellable fibers may be incorporated into a cable without the use of adhesives, such as physical adhesives and/or hot melt adhesives. Additionally, the water swellable materials may be incorporated without the use of a tape, a yarn, or another substrate. As a result of not using a tape, yarn, or other substrate, the overall cost of the cable may be reduced. In certain embodiments, the diameter and/or other relevant dimensions of the cable may be reduced. Additionally, in certain embodiments, the use of discrete water swellable materials may permit the formation of a relatively dry cable. In other words, the cable (or at least a buffer tube) may be formed to be substantially free of fluids or gels, such as water blocking gels.

A wide variety of suitable methods and/or techniques may be utilized as desired to incorporate water swellable materials and/or other suitable materials into a cable. In one example embodiment, water swellable fibers may be air blown or injected into a buffer tube or a sheath during construction of a cable. In another example embodiment, water swellable fibers may be extruded onto one or more transmission media (e.g., optical fibers), and a buffer tube or other sheath may be formed around the transmission media and water swellable fibers. In yet another example embodiment, water swellable fibers may be applied to one or more transmission media by physical contact or electrostatic attraction, and a buffer tube or other sheath may be formed around the transmission media and water swellable fibers.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1, a cross-sectional view of an example water-resisting optical fiber cable 100 is illustrated. Although the cable 100 is illustrated as an optical fiber cable, a wide variety of other types of cables may incorporate water swellable materials similar to those described herein, such as twisted pair communication cables, power cables, and/or a wide variety of composite cables (e.g., cables including a combination of optical fiber(s) and other transmission media). Additionally, embodiments of the disclosure may be utilized in association with drop cables, horizontal cables, vertical cables, flexible cables, plenum cables, riser cables, or any other appropriate cables.

The cable 100 may include an outer jacket 105, and at least one optical fiber subunit may be situated or positioned within the outer jacket 105. As shown in FIG. 1, each of the optical fiber subunits may include a buffer tube 110A-F, and one or more respective optical fibers may be positioned within each buffer tube. Other types of optical fiber subunits may be utilized as desired, such as optical fiber subunits that include a single layer sheath, a multilayer sheath, or a sheath coated with microbeads. In other embodiments, one or more optical fibers may be positioned within the outer jacket 105 without the use of a buffer tube or other intermediate sheath.

The outer jacket 105 may enclose the internal components of the cable 100, seal the cable 100 from the environment, and provide strength and structural support. The jacket 105 may be formed from a wide variety of suitable materials, such as a polymeric material, polyvinyl chloride ("PVC"), polyurethane, one or more polymers, a fluoropolymer, polyethylene, neoprene, cholorosulphonated polyethylene, polypropylene, modified ethylene-chlorotrifluoroethylene, ethylene-vinyl acetate ("EVA"), fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. In certain embodiments, the jacket 105 can include flame retardant and/or smoke suppressant materials. Additionally, the jacket 105 may include a wide variety of suitable shapes and/or dimensions. For example, as shown in FIG. 1, the jacket 105 may be formed to result in a round cable or a cable having an approximately circular cross-section. In other embodiments, the jacket 105 may be formed to result in other desired shapes, such as an elliptical shape (e.g., a cable having an approximately oval cross-section) or a rectangular shape. The jacket 105 may also have a wide variety of dimensions, such as any suitable or desirable outer diameter and/or any suitable or desirable wall thickness. In various embodiments, the jacket 105 can be characterized as an outer jacket, an outer sheath, a casing, a circumferential cover, or a shell.

The jacket 105 may enclose one or more openings in which other components of the cable 100 are disposed. At least one opening enclosed by the jacket 105 may be referred to as a cable core, and transmission media may be disposed in the cable core. In the cable 100 illustrated in FIG. 1, a plurality of buffer tubes 110A-F may be disposed in the cable core. In certain embodiments, the jacket 105 may be extruded or poltruded over the buffer tubes 110A-F during construction of the cable 100. For example, the buffer tubes 110A-F may be stranded or otherwise cabled together, and the jacket 105 may be formed over the stranded buffer tubes 100A-F.

The jacket 105 may be a single layer jacket or, alternatively, may have multiple layers. In certain embodiments, such as the fiber drop cable embodiment illustrated in FIG. 2, a first (or inner) jacket layer may be extruded or otherwise formed over the fiber subunit(s). A second (or outer) jacket layer may then be extruded or otherwise formed over the first jacket layer and one or more strength rods. The second jacket layer may be designed to be at least partially stripped from the inner jacket layer, for example, using a suitable stripping tool. As a result, the outer jacket layer and the strength rods can be selectively removed from the cable 100. When the outer jacket layer is maintained, the cable 100 may be more suitable for outdoor deployment. When the outer jacket layer is removed or stripped, the cable 100 may be more suitable for indoor deployment. Thus, the outer jacket layer may be selectively removed during installation of the cable and a portion of the cable may be deployed in an outdoor environment while another portion of the cable is deployed in an indoor environment.

In certain embodiments, one or more strength members may be incorporated into the cable 100. For example, one or more strength members, such as central strength member 115, may be disposed or positioned within a cable core. As desired, the buffer tubes 110A-F (and/or other cable components situated within the cable core) may be stranded around the central strength member 115. For example, the buffer tubes 100A-F may be helically twisted or S-Z stranded about the buffer tubes 110A-F. In other embodiments, one or more strength members may be embedded in the cable jacket 105. For example, strength rods may be embedded in the cable jacket 105 on opposite sides of a cable core. In another example embodiment, the cable 100 can be formed with a "figure-8" design that is suitable for aerial deployment, for example, spanning between poles. In such a design, a strength member can be positioned within one loop of the figure-8 and a cable core containing one or more transmission media may be positioned within the other loop. Indeed, a wide variety of different cable constructions may incorporate one or more fiber subunits and one or more strength members at various positions.

Strength members, such as the central strength member 115, may be formed from a wide variety of suitable materials. For example, strength members may be formed from metal wires (e.g., steel wire, etc.), metal rods, plastic rods, fiber-reinforced plastic ("FRP") rods, glass-reinforced plastic ("GRP") rods, fiberglass, or any other suitable material or combination of materials. As desired, a strength member may be formed from a plurality or combination of materials. For example, a strength member may be formed as a central rod (e.g., an FRP rod, etc.) that is coated with one or more additional layers, such as an elastomeric layer (e.g., silicone rubber, etc.) that provides compression cushioning and/or a friction inducing coating that promotes physical bonding and/or thermal coupling between the strength member and the buffer tubes 110A-F. Additionally, a strength member may have any desired diameter and/or other dimensions as desired in various embodiments. For example, a strength member may be sized based upon a number of buffer tubes 110A-F and/or other cable components that are stranded with the strength member.

Each optical fiber subunit may include a suitable sheath layer (or sheath), and one or more optical fibers may be positioned within the sheath. As shown in FIG. 1, a plurality of buffer tubes 100A-F may be provided, and each buffer tube (generally referred to as buffer tube 110) may contain one or more optical fibers. Any number of buffer tubes may be utilized as desired in various embodiments, such as one buffer tube, two buffer tubes, four buffer tubes, six buffer tubes, twelve buffer tubes, twenty four buffer tubes, etc. A buffer tube 110 may be formed from any number of suitable materials, such as polybutylene terephthalate ("PBT"), polypropylene ("PP"), other suitable polymers or polymeric materials, one or more acrylates or acrylics (e.g., acrylic elastomers, etc.), polyvinyl chloride ("PVC"), polyurethane, one or more fluoropolymers, polyethylene, etc. In certain embodiments, a buffer tube 110 may be a composite or include multiple polymeric materials. A buffer tube 110 may be formed with any number of layers, such as one layer, two layers, or more than two layers. As desired, other materials may be adhered to, embedded in, or mixed with a polymer (or other substance) utilized to form a buffer tube layer. For example, microbeads or microspheres may be embedded in an outer surface of a buffer tube 110 in order to reduce the coefficient of friction between the buffer tube 110 and other components of the cable 100. As another example, smoke suppressant or flame retardant material may be incorporated into a buffer tube 110. Further, a buffer tube 110 may have any suitable inner and/or outer diameters as desired in various applications.

As desired, any number of suitable transmission media may be incorporated into a cable 100 and enclosed by the cable jacket 105. As shown in FIG. 1, optical fibers may be situated within each of the buffer tubes 110A-F. In other embodiments, twisted pair conductors, power conductors, tight-buffered optical fibers, and/or other transmission media may be situated within a cable core. For example, a bundle of twisted pairs may be substituted for one of the buffer tubes illustrated in the cable 100 of FIG. 1. As desired, other transmission media may be situated within a suitable sheath, shield layer, or other protective layer. For example, twisted pairs may be individually shielded or a shield may be formed around a group of twisted pairs. Indeed, a wide variety of cable configurations may be utilized as desired in various embodiments of the disclosure. These configurations may include optical fiber cables, twisted pair communication cables, control cables, and/or a wide variety of composite cables.

As desired, optical fibers 120 may be loosely positioned in a buffer tube 100, wrapped or bundled together, or provided in one or more ribbons. As shown in FIG. 1, certain buffer tubes 110A, 110C, 110D, 110F may include loose optical fibers while other buffer tubes 110B, 110E include optical fiber ribbons. In certain embodiments, a buffer tube 110 may be a tube that contains one or more optical fibers and that provides the optical fibers with annular space for lateral movement. In other embodiments, optical fibers may be positioned in one or more microtubes that allow limited lateral movement. Additionally, in certain embodiments, a ripcord may be positioned within a buffer tube 110.

Any number of optical fibers 120 may be incorporated into a buffer tube 110, such as one, two, three, four, eight, twelve, or some other number of fibers. Each optical fiber 120 may be a single mode fiber, multi-mode fiber, or some other optical waveguide that carries data optically. Additionally, each optical fiber 120 may be configured to carry data at any desired wavelength (e.g., 1310 nm, 1550 nm, etc.) and/or at any desired transmission rate or data rate, such as a transmission rate between approximately 10 Giga bits per second ("Gbps") and approximately 40 Gbps. The optical fibers 120 may also include any suitable composition and/or may be formed from a wide variety of suitable materials capable of forming an optical transmission media, such as glass, a glassy substance, a silica material, a plastic material, or any other suitable material or combination of materials. Each optical fiber 120 may also have any suitable cross-sectional diameter or thickness. For example, single mode fiber may have a core diameter between approximately 8 micrometers and approximately 10.5 micrometers with a cladding diameter of approximately 125 micrometers. As another example, a multi-mode fiber may have a core diameter of approximately 50 micrometers or 62.5 micrometers with a cladding diameter of 125 micrometers. Other sizes of fibers may be utilized as desired.

According to an aspect of the disclosure, water swellable material may be incorporated into the cable 100. For example, discrete water swellable fibers or other suitable material may be loosely positioned or incorporated into the cable 100. In certain embodiments, water swellable material may be positioned within one or more of the buffer tubes 110A-F (or other sheaths). In other embodiments, water swellable material may be positioned in the interstitial spaces between buffer tubes 110A-F and/or other components incorporated into the cable core. As shown in FIG. 1, water swellable fibers 125 may be loosely positioned within each of the buffer tubes 110A-F. The water swellable fibers 125 may provide water blocking and/or moisture resistance for the optical fibers 120.

In certain embodiments, a suitable sheath, protective sleeve, wrap, or other layer may be situated within a buffer tube 110 (e.g., around the one or more optical fibers, etc.), and the swellable fibers 125 may be positioned between the sheath (or other layer) and the inside surface of the buffer tube 110 (or between the sheath and another layer positioned within the buffer tube 110). In other embodiments, the swellable fibers 125 may be positioned or situated adjacent to an outer surface of one or more optical fibers 120 within the buffer tube 110.

As desired in various embodiments, a wide variety of different types of swellable materials may be utilized. These swellable materials may include super absorbent yarn fibers 125 or other water swellable fibers that provide water penetration resistance. In certain embodiments, water swellable fibers 125 may be formed as sodium polyacrylate fibers or as fibers that include sodium polyacrylate; however, other types of fibers, water blocking polymers, and/or combinations of materials may be utilized. For example, any suitable absorbent polymeric fiber or fiber including a combination of absorbent polymers and/or other materials may be utilized. Additionally, in certain embodiments, the swellable materials may include pulped materials, such as pulped superabsorbent yarn fibers.

According to an aspect of the disclosure, the water swellable fibers 125 may be discrete fibers. In other words, each fiber may be separate from the other fibers when incorporated into the cable 100. More particularly, the fibers 125 are not adhered or fixedly coupled to one another. The fibers 125 are also not adhered or attached to a substrate layer, such as a tape. Additionally, the water swellable fibers 125 may be loosely incorporated into the cable 100. In other words, individual discrete fibers may be positioned within the cable to provide water resistance, moisture mitigation, and/or water blocking.

As desired in various embodiments, the water swellable fibers 125 may include a wide variety of suitable dimensions and/or shapes. In one example embodiment, the fibers 125 may be elongated and relatively cylindrical or elliptical in cross-section. In other embodiments, the fibers 125 may be elongated and relatively rectangular in cross-section. In yet other embodiments, the fibers 125 may be approximately spherical. Additionally, the fibers 125 may include any desired lengths, widths, thicknesses, cross-sectional areas, and/or other dimensions. For example, in certain embodiments, relatively elongated fibers may each have lengths in the range of approximately 2 mm to approximately 200 mm. In other embodiments, relatively elongated fibers may each have a length greater than approximately 2 mm, greater than approximately 5 mm, greater than approximately 10 mm, greater than approximately 25 mm, greater than approximately 50 mm, greater than approximately 100 mm, greater than approximately 200 mm, approximately equal to 200 mm, and/or in any range between two of the above values.

In certain embodiments, one or more materials may be combined to form the swellable materials. For example, a wide variety of different types of swellable powders may be combined with polymeric material(s) to form swellable fibers 125. As another example, a combination of polymers may be combined to form swellable fibers 125. Additionally, as desired, other materials may be mixed or blended with the swellable materials prior to the swellable materials being positioned in the cable 100. For example, a loose mixture or blend of swellable fibers 125 and other materials may be incorporated into a cable 100. Examples of suitable materials that may be mixed or blended with swellable materials include, but are not limited to, talc, polymeric microspheres, foam rubber, various polymers, antioxidants, and/or other suitable materials. These other materials may serve a wide variety of different purposes including, but not limited to, friction reduction, thermal stability, flame retardance, smoke suppression, char formation, the promotion of exothermic and/or endothermic behavior, hydrogen and/or oxygen scavenging, and/or extinguishant functions. In certain embodiments, materials may be combined, mixed, or blended prior to the resulting mixture being incorporated into a cable 100. In other embodiments, materials (or certain combinations of materials) may be independently incorporated into a cable 100.

In certain embodiments, certain materials combined with the swellable materials may enhance coupling between various cable components. For example, blending or mixing polymeric microspheres, foam rubber, or other friction inducing substances with swellable fibers 125 may provide friction that aids in coupling the swellable fibers 125 to other cable components (e.g., an optical fiber, an optical fiber ribbon, a buffer tube, etc.). Additionally, friction inducing substances may promote coupling between transmission media (e.g., optical fibers, fiber ribbons, etc.) and a buffer tube or other sheath.

A wide variety of suitable methods and/or techniques may be utilized to incorporate swellable materials, such as swellable fibers 125, into the cable 100. In certain embodiments, swellable fibers 125 may be blown or injected into a cable during cable construction. For example, a buffer tube 110 may be formed around one or more optical fibers 120 during cable construction. Swellable fibers 125, such as pulped or chopped swellable fibers, may then be air blown or otherwise injected into a buffer tube 125 prior to the extrusion of an outer jacket 105. Similarly, swellable fibers 125 may be air blown or otherwise injected into a cable sheath, such as an outer jacket of a drop cable. As another example, swellable fibers 125 may be extruded onto a cable component during assembly of a cable 100. For example, swellable fibers 125 may be extruded onto an optical fiber, a bundle of optical fibers, or an optical fiber ribbon prior to the formation of a buffer tube 120 or sheath during cable construction. As other examples, swellable materials may be applied by physical contact or electrostatic attraction. For example, an optical fiber may be passed through swellable fibers 125, such as electrically charged swellable fibers, and the swellable fibers 125 may at least temporarily cling to the optical fiber prior to the formation of a buffer tube 120 or sheath. Other techniques for incorporating discrete swellable materials into a cable 100 will be appreciated.

In certain embodiments, swellable materials may be incorporated into a cable 100 along an entire length of the cable 100, such as along the entire longitudinal length of the cable 100. In other embodiments, swellable materials may be intermittently incorporated into a cable 100 or, in other words, incorporated in a discontinuous manner. For example, swellable materials may be incorporated into a cable 100 at regular or irregular intervals to provide water blocking for the cable 100. Accordingly, a gap or space may be present in the longitudinal direction of a cable between two sections or instances of swellable materials. As desired, spaces or seals may be incorporated into a buffer tube or sheath to separate sections of water swellable materials. As desired, swellable materials may be incorporated in a discontinuous manner in order to satisfy applicable water blocking requirements. For example, if an applicable cable standard or water blocking requirement specifies that a cable should be water blocked every meter, then swellable material may be incorporated intermittently with gaps that are less than approximately one meter in length. As a result of incorporating water blocking material in a discontinuous manner, an amount of water blocking material incorporated into a cable 100 may be reduced, thereby lowering the cost of the cable 100 and enhancing cable flexibility.

As a result of loosely positioning or incorporating discrete water swellable materials into a cable 100, it is possible to reduce or eliminate the use of water blocking tapes, water blocking yarns, or other absorbent material substrates from the cable 100. In other words, the cable 100 and/or one or more buffer tubes 110A-F (or other internal sheaths) may be formed to be substantially free of water blocking yarns and/or water blocking tapes. As a result, the overall cost of the cable 100 may be reduced. Additionally, the diameter and/or other dimensions of the cable 100 (e.g., the overall cable weight, etc.) may be reduced relative to cables that incorporate yarns or tapes. Additionally, use of discrete swellable materials may provide greater flexibility for cable components (e.g., optical fibers). The discrete swellable materials may also provide enhanced absorbency relative to conventional cables that utilize yarns or tapes, as the swellable materials may be relatively tightly packed without the use of a substrate layer.

Additionally, in certain embodiments, the cable 100 may be formed as a dry cable. The term "dry," as used herein in the context of characterizing a fiber optic cable or a fiber subunit (e.g., a buffer tube, etc.) within a cable, generally indicates that the fiber optic cable or fiber subunit does not contain any fluids, greases, or gels for blocking water incursion. As a result, it may be easier for a technician to install the cable as the technician will not be required to wipe off a grease or gel when the internal contents of the fiber subunit are accessed.

As desired in various embodiments, a wide variety of other materials may be incorporated into the cable 100. For example, the cable 100 may include an armor layer (e.g., a metal armor layer, a corrugated armor layer, etc.) and/or a location element. An example location element may include a metallic wire (e.g., a copper wire) or strip embedded into or attached to the jacket 105 that permits the cable to be located, for example, when buried. Additionally, as desired, the cable 100 may include a wide variety of strength members, insulating materials, dielectric materials, flame retardants, flame suppressants or extinguishants, and/or other materials. In certain embodiments, water swellable tapes, yarns, and/or other water blocking materials may be incorporated into a cable. For example, discrete water swellable fibers may be loosely positioned within the buffer tubes 110A-F and an overall water blocking tape or yarn may be formed around the plurality of buffer tubes 110A-F within the outer jacket 105.

Figure 2:
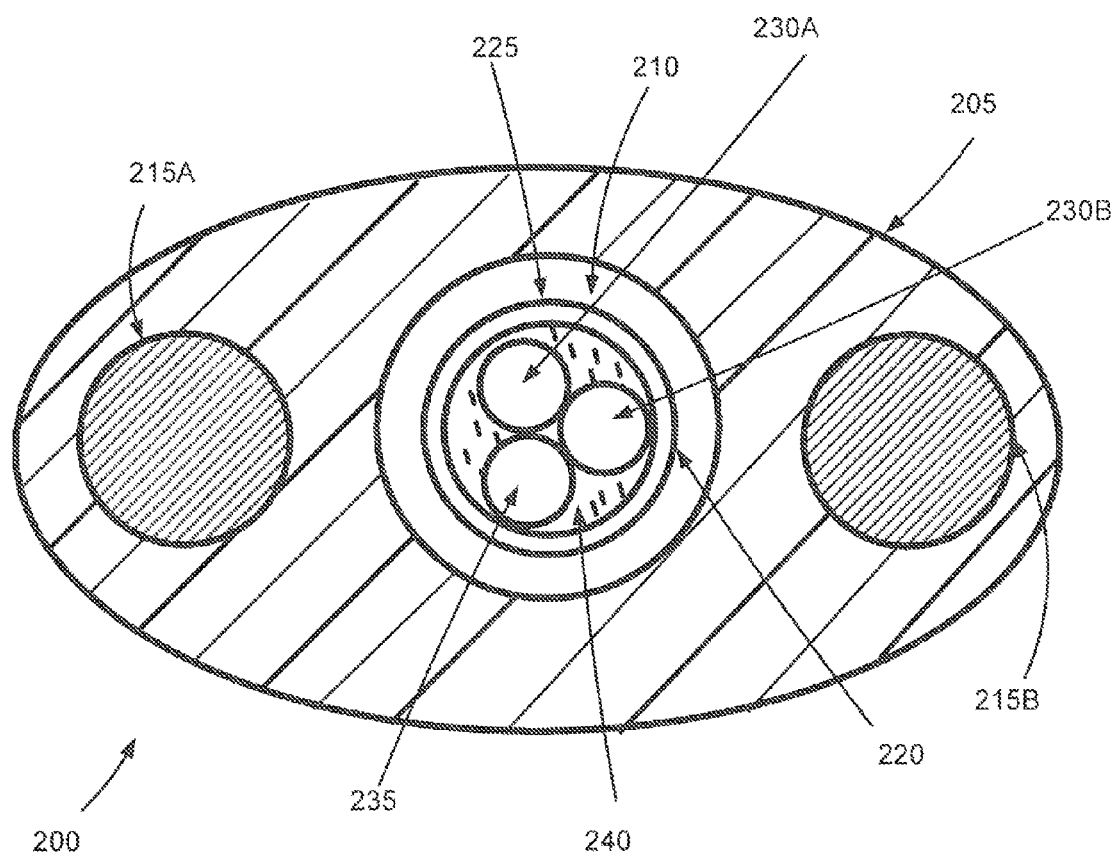
FIG. 2 is a cross-sectional view of another example water-resistant optical fiber cable, according to an illustrative embodiment of the disclosure.

FIG. 2 is a cross-sectional view of another example water-resistant optical fiber cable 200, according to an illustrative embodiment of the disclosure. The cable 200 of FIG. 2 may include components similar to those described above with reference to the cable 100 of FIG. 1. However, the cable 200 of FIG. 2 may include fewer optical fibers, and therefore, have smaller dimensions (e.g., a smaller diameter, etc.) than the cable 100 of FIG. 1. The cable 200 of FIG. 2 may be an optical fiber drop cable. The cable may include an outer jacket 205, and an opening or cable core 210 may be defined in the outer jacket 205. Additionally, in certain embodiments, one or more strength members may be embedded within the outer jacket 205. For example, strength members 215A, 215B may be embedded in the outer jacket on opposite sides of the cable core 210. In certain embodiments, the outer jacket 205 may include a plurality of sections or components. For example, an outer portion of the jacket 205 may be separable from an inner portion, thereby allowing the outer portion and the strength members 215A, 215B to be stripped off or removed from the inner portion and the cable core 210.

Additionally, at least one optical fiber subunit 220 may be disposed within the cable core 210. The subunit 220 may include a suitable sheath 225, such as a single layer or multi-layer sheath. The sheath 225 may be formed from a wide variety of suitable materials and/or combinations of materials. As desired, any number of suitable materials may be incorporated into and/or embedded into the sheath 225. For example, polymeric microspheres may be embedded into an outer surface of the sheath 225 to reduce the coefficient of friction between the sheath 225 and an inner surface of the cable core 210. As another example, flame retardant and/or smoke suppressant materials may be blended with one or more polymeric materials utilized to form the sheath 225. One or more optical fibers, such as optical fibers 230A, 230B, may be disposed or positioned within the sheath 225. In certain embodiments, a ripcord 235 may also be positioned within the sheath 225.

According to an aspect of the disclosure, water swellable material, such as discrete water swellable fibers 240, may be loosely positioned within the sheath 225 of the fiber subunit 220. These water swellable fibers 240 may be similar to the fibers 125 discussed above with reference to FIG. 1. Additionally, the water swellable fibers 240 may be mixed with a wide variety of other materials as desired in various embodiments, such as friction inducing substances, smoke suppressants, and/or flame retardants. Further, as described above with reference to FIG. 1, a wide variety of suitable methods and/or techniques may be utilized to incorporate the water swellable fibers 240 into the cable 200.

The cables 100, 200 illustrated in FIGS. 1 and 2 are provided by way of example only. Embodiments of the disclosure contemplate a wide variety of other cables and cable constructions. These other cables may include more or less components than the cables 100, 200 illustrated in FIGS. 1 and 2. Additionally, certain components may have different dimensions and/or be formed from different materials than the components illustrated in the cables 100, 200 of FIGS. 1 and 2. In addition to fiber optic cables, embodiments of the disclosure may be utilized in association with a wide variety of other types of cables, including but not limited to, coaxial cables, twisted pair cables, power cables, communications cables, and/or hybrid cables. In certain embodiments, one or more conductors and/or optical fibers may form a cable core. As desired, swellable materials may be incorporated into the cable core (e.g., within a buffer tube, between cable components, etc.) and/or external to the cable core.

Figure 3:
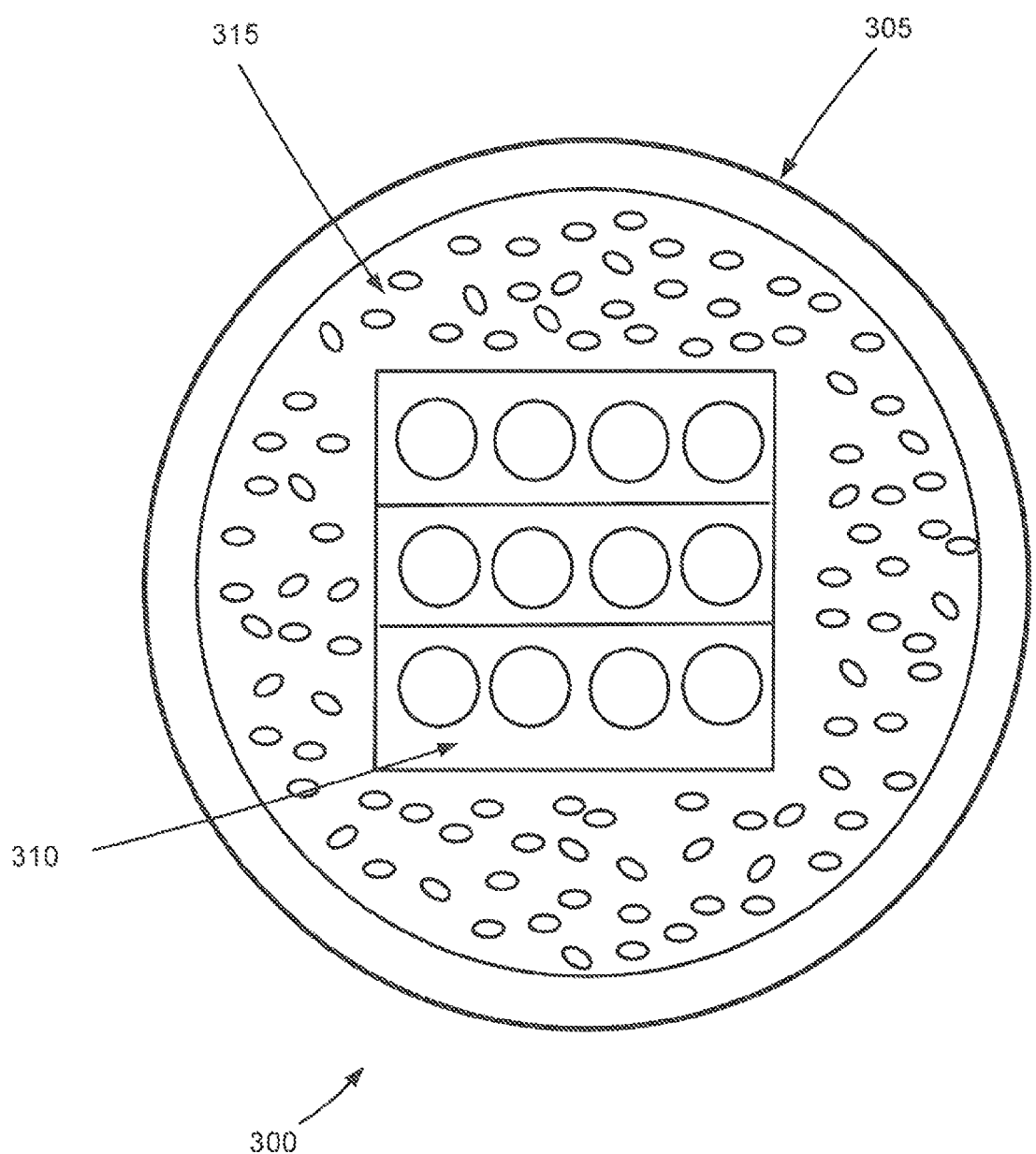
FIG. 3 is a cross-sectional view of an example buffer tube incorporating water swellable fibers, according to an illustrative embodiment of the disclosure.

FIG. 3 is a cross-sectional view of an example buffer tube 300 incorporating water swellable fibers, according to an illustrative embodiment of the disclosure. The buffer tube 300 may be incorporated into a wide variety of suitable cables, such as the cables 100, 200 described above with reference to FIGS. 1 and 2. The buffer tube 300 may include an outer sheath 305, and one or more optical fibers 310 may be positioned within the sheath 305. As desired in various embodiments, the sheath 305 may be formed as a single layer or multi-layer sheath. Additionally, as set forth above with reference to FIG. 1, the sheath 305 may be formed from a wide variety of suitable materials and/or combinations of materials, such as polybutylene terephthalate ("PBT"), polypropylene ("PP"), other suitable polymers or polymeric materials, one or more acrylates or acrylics (e.g., acrylic elastomers, etc.), polyvinyl chloride ("PVC"), polyurethane, one or more fluoropolymers, polyethylene, etc.

With continued reference to FIG. 3, the one or more optical fibers 310 are illustrated as an optical fiber ribbon. In other embodiments, one or more loose optical fibers may be positioned within the sheath 305 of the buffer tube 300. Additionally, according to an aspect of the disclosure, water swellable material, such as discrete water swellable fibers 315, may be loosely positioned within the sheath 305 of the buffer tube 300. These water swellable fibers 315 may be similar to the fibers 125 discussed above with reference to FIG. 1. Additionally, the water swellable fibers 315 may be mixed with a wide variety of other materials as desired in various embodiments, such as friction inducing substances, smoke suppressants, and/or flame retardants. Further, as described above with reference to FIG. 1, a wide variety of suitable methods and/or techniques may be utilized to incorporate the water swellable fibers 315 into the buffer tube 300.

Figure 4A:
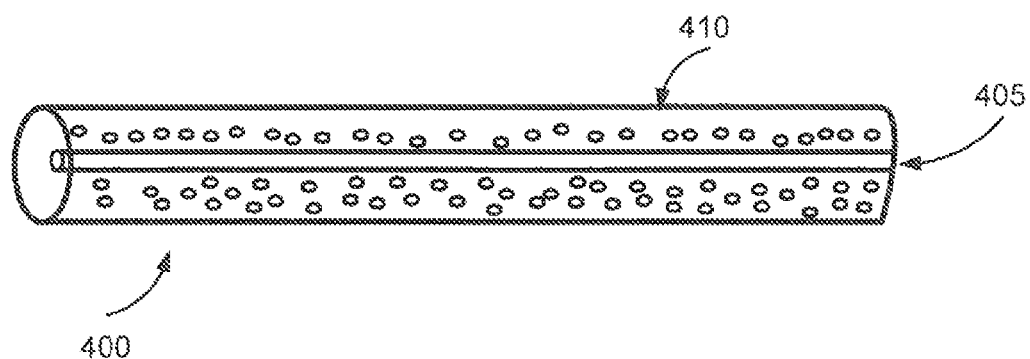
FIGS. 4A-4C are side views of example buffer tubes incorporating water swellable fibers, according to illustrative embodiments of the disclosure.
Figure 4B:
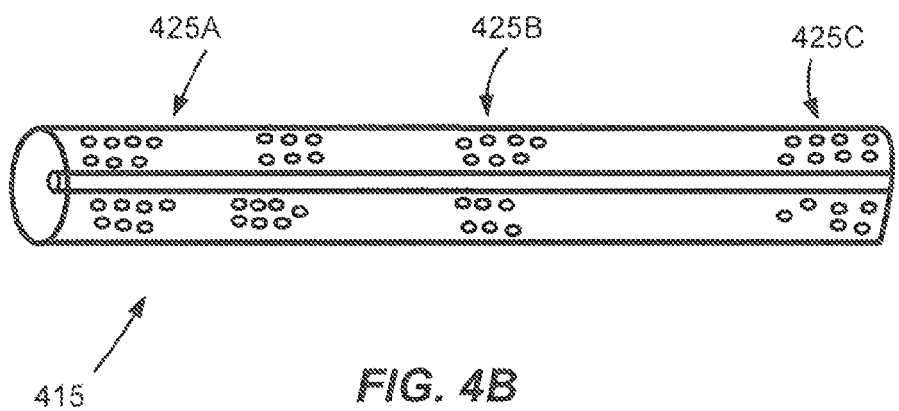
Figure 4C:
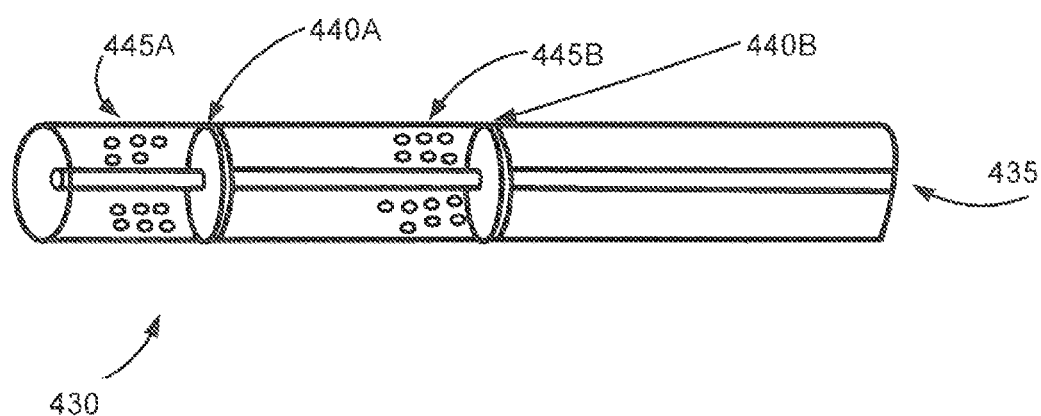

FIGS. 4A-4C are side views of example buffer tubes 400, 415, 430 incorporating water swellable fibers, according to illustrative embodiments of the disclosure. These buffer tubes 400, 415, 430 may be incorporated into a wide variety of suitable cables, such as the cables 100, 200 described above with reference to FIGS. 1 and 2. Turning first to FIG. 4A, a first example buffer tube 400 is illustrated. At least one optical fiber 405 may be disposed within the buffer tube 400, and the at least one optical fiber 405 may extend along a longitudinal length of the buffer tube 400. Additionally, discrete water swellable fibers 410 may be loosely positioned within the buffer tube 400. For example, water swellable fibers 410 may be positioned between the at least one optical fiber 405 and an inner surface of a buffer tube sheath. As shown in FIG. 4A, in certain embodiments, the water swellable fibers 410 may be incorporated into the buffer tube 400 along a longitudinal length of the buffer tube 400. In other words, the water swellable fibers 410 may be incorporated into the buffer tube 400 in a relatively continuous manner.

FIG. 4B illustrates a second example buffer tube 415 incorporating water swellable fibers. At least one optical fiber 420 may be disposed within the buffer tube 415, and the at least one optical fiber 420 may extend along a longitudinal direction of the buffer tube 415. Additionally, discrete water swellable fibers 425A, 425B, 425C may be disposed within the buffer tube 415. As shown in FIG. 4B, the water swellable fibers may be incorporated into the buffer tube 415 in a discontinuous manner. For example, the water swellable fibers may be positioned at spaced intervals along a longitudinal length of the buffer tube 415, such as regular spaced intervals, periodic spaced intervals, or random intervals. In FIG. 4B, three sections of water swellable fibers 425A, 425B, 425C are illustrated; however, any number of sections may be provided. Any suitable spacing, gap, or distance may be provided between adjacent sections. In certain embodiments, the spacing may be determined based at least in part on water blocking requirements for a cable. For example, if a cable is required to be water blocked every meter, then the space between each adjacent section of water blocking fibers may be less than approximately one meter in length.

As desired in various embodiments, any suitable number or amount of water swellable fibers may be incorporated into the buffer tube 415 at any given section. In certain embodiments, water swellable fibers may be provided in a suitable amount and/or bulk density to cause the fibers to clump or together at a desired point within the buffer tube 415. Accordingly, an amount of fibers provided at each section may be based at least in part upon a number of optical fibers positioned within the buffer tube 415, the cross-sectional area(s) of the optical fibers, an inner diameter of the buffer tube 415, the sizes and/or other dimensions of the fibers, and/or the type(s) and dimensions of other materials blended with the fibers.

FIG. 4C illustrates a third example buffer tube 430 incorporating water swellable fibers. At least one optical fiber 435 may be disposed within the buffer tube 430, and the at least one optical fiber 435 may extend along a longitudinal direction of the buffer tube 430. Similar to the buffer tube 415 of FIG. 4B, water swellable fibers may be positioned within the buffer tube 430 in a discontinuous manner. However, the buffer tube 430 of FIG. 4C may additionally include suitable spacers 440A, 440B that define water blocking sections. An example spacer (generally referred to as spacer 440) may extend approximately from the optical fiber(s) 435 to an inner surface of a buffer tube sheath. Additionally, a spacer 440 may be formed from a wide variety of suitable materials and/or combinations of materials, such as epoxies, resins, polymers, thermoplastics, plastics, and/or curable materials. The spacers may be positioned at any desired intervals, such as at intervals spaced in accordance with a repeating pattern or at random intervals. Additionally, water swellable fibers 445A, 445B may be positioned with the buffer tube 430 between adjacent spacers.

A wide variety of other suitable buffer tube designs may be utilized as desired in various embodiments of the disclosure. The buffer tubes 400, 415, 430 illustrated in FIGS. 4A-4C are provided by way of example only. Other buffer tubes may include more or less components than the buffer tubes 400, 415, 430 illustrated in FIGS. 4A-4C. Additionally, certain components may have different dimensions and/or be formed from different materials than the components illustrated in the buffer tubes 400, 415, 430 of FIGS. 4A-4C.

Figure 5:
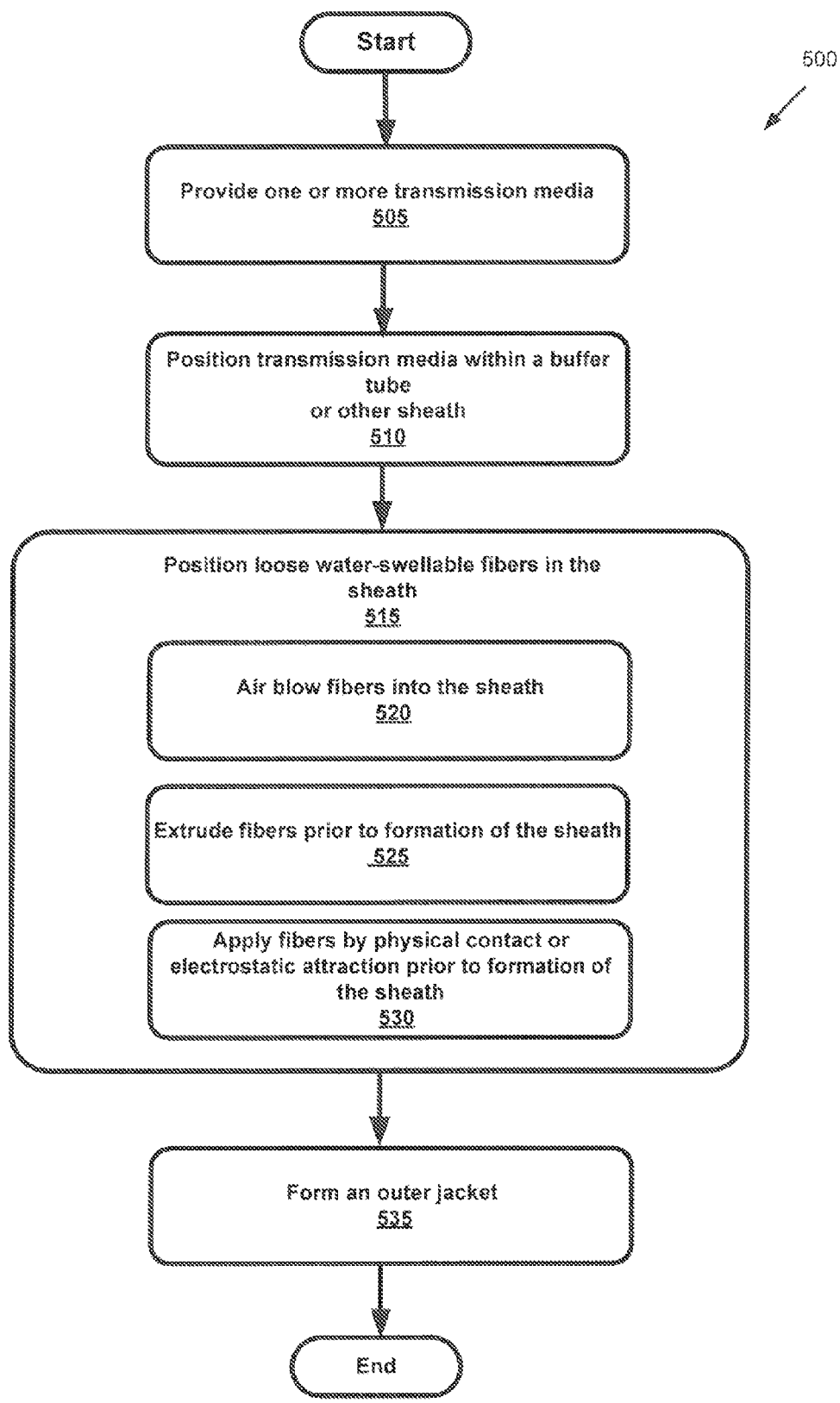
FIG. 5 is a flow chart illustrating an example method for forming a water-resistant cable, according to illustrative embodiments of the disclosure.

FIG. 5 is a flow chart illustrating an example method 500 for forming a water-resistant cable, according to illustrative embodiments of the disclosure. The method 500 may facilitate the incorporation of loose water swellable fibers or other suitable discrete water swellable substances into a wide variety of different cables, such as the cables 100, 200 described above with reference to FIGS. 1 and 2. The method 500 may begin at block 505.

At block 505, one or more transmission media may be provided. For example, one or more optical fibers, electrical conductors, twisted pair conductors, and/or other suitable transmission media may be provided. In certain embodiments, the transmission media may be fed from bins, reels, or spools into a suitable cabling system. As desired, certain transmission media may be bundled together. In one example embodiment, the one or more transmission media may include one or more optical fibers to be positioned within a buffer tube or other suitable sheath.

At block 510, the one or more transmission media may be positioned within a buffer tube or other suitable sheath. For example, a buffer tube may be extruded around or otherwise formed around the one or more transmission media. In certain embodiments, one or more extrusion heads and/or dies may be utilized to form a buffer tube. At block 515, loose water swellable fibers may be positioned within the buffer tube or other sheath. The water swellable fibers may be discrete fibers that are loosely positioned within the buffer tube or other sheath without the use of adhesives and/or various substrates, such as tapes. In certain embodiments, the water swellable fibers may be inserted into a buffer tube or other sheath following formation of tube or sheath. In other embodiments, the water swellable fibers may be positioned adjacent to the one or more transmission media prior to the formation of the buffer tube or other sheath.

A wide variety of suitable techniques may be utilized to position loose water swellable fibers within a buffer tube or other sheath. For example, at block 520, water swellable fibers may be air blown or otherwise injected into a buffer tube or other sheath. In one example embodiment, compressed or pressurized air (or another suitable gas) may be utilized to propel or blow water swellable fibers into a buffer tube either intermittently or in a relatively continuous manner as a cable is formed. As another example of positioning water swellable fibers, fibers may be extruded onto one or more transmission media at block 525. A buffer tube or other sheath may then be formed over the transmission media and the water swellable fibers. As yet another example of positioning water swellable fibers, the one or more transmission media may be passed through water swellable fibers at block 530, and the water swellable fibers may be applied to the transmission media via physical contact or electrostatic attraction. A buffer tube or other sheath may then be formed over the transmission media and the water swellable fibers. Other techniques for incorporating water swellable fibers into a buffer tube or other sheath will be appreciated, and the techniques discussed herein are provided by way of example only.

In certain embodiments, water swellable fibers may be incorporated into a buffer tube or other sheath in a relatively continuous manner approximately along a longitudinal length of the buffer tube or sheath. In other embodiments, water swellable fibers may be incorporated in a discontinuous manner, for example, at regular spaced intervals or at random intervals. Following incorporation of water swellable fibers into a buffer tube, an outer jacket may be formed around the buffer tube and, in certain embodiments, other cable components (e.g., additional buffer tubes, a shield layer, an armor layer, etc.) at block 535. In other embodiments, such as certain drop cable embodiments, the outer jacket may be formed as the sheath that contains the transmission media. Operations may then end following block 535.

The operations described and shown in the method 500 of FIG. 5 may be carried out or performed in any suitable order as desired in various embodiments. Additionally, in certain embodiments, at least a portion of the operations may be carried out in parallel. Furthermore, in certain embodiments, less than or more than the operations described in FIG. 5 may be performed.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable, comprising:
    an outer jacket defining a cable core;
    a buffer tube situated within the cable core;
    at least one optical fiber positioned within the buffer tube; and
    a plurality of discrete elongated water swellable fibers loosely positioned within the buffer tube, each of the water swellable fibers having a longest dimension between approximately two millimeters and approximately two hundred millimeters, wherein the plurality of water swellable fibers are not adhered to a longitudinally extending substrate layer.

2. The cable of claim 1, wherein the water swellable fibers comprise sodium polyacrylate.

3. The cable of claim 1, further comprising at least one of (i) friction reducing material, (ii) flame retardant material, or (iii) smoke suppressant material mixed with the water swellable fibers.

4. A cable, comprising:
    at least one optical fiber;
    a buffer tube formed around the at least one optical fiber along a longitudinal length of the cable;
    a plurality of discrete and discontinuous elongated water swellable fibers loosely positioned within the buffer tube to provide water penetration resistance for the at least one optical fiber, each of the water swellable fibers having a longest dimension between approximately two millimeters and approximately two hundred millimeters; and
    an outer jacket formed around the buffer tube.

5. The cable of claim 4, wherein the plurality of water swellable fibers are not adhered to a longitudinally extending substrate layer.

6. The cable of claim 4, wherein the water swellable fibers comprise pulped superabsorbent yarn fibers.

7. The cable of claim 4, wherein the water swellable fibers comprise sodium polyacrylate.

8. The cable of claim 4, further comprising a friction-inducing material mixed with the water swellable fibers.

9. The cable of claim 4, further comprising at least one of (i) talc particles, (ii) polymeric microspheres, (iii) foam rubber particles, or (iv) flame retardant particles mixed with the water swellable fibers.

10. The cable of claim 4, wherein the water swellable fibers are air blown into the buffer tube.

11. The cable of claim 4, wherein the water swellable fibers are extruded onto the at least one optical fiber prior to formation of the buffer tube.

12. The cable of claim 4, wherein the water swellable fibers are applied to the optical fiber by at least one of physical contact or electrostatic attraction.

13. The cable of claim 4, wherein the water swellable fibers are positioned at discontinuous intervals along the longitudinal length of the cable.

14. A cable comprising:
    a cable core;
    one or more transmission media positioned in the cable core;
    a sheath surrounding the cable core; and
    discrete and discontinuous elongated water swellable particles loosely positioned within the sheath to provide water penetration resistance for the cable core, each of the water swellable particles having a longest dimension between approximately two millimeters and approximately two hundred millimeters, wherein none of the water swellable particles are adhered to a substrate layer.

15. The cable of claim 14, wherein the water swellable particles comprise sodium polyacrylate.

16. The cable of claim 14, further comprising a friction-inducing material mixed with the water swellable particles.

17. A method for forming a cable, the method comprising:
    providing at least one optical fiber;
    forming a buffer tube around the at least one optical fiber;
    loosely positioning discrete and discontinuous elongated water swellable fibers within the buffer tube, each of the water swellable fibers having a longest dimension between approximately two millimeters and approximately two hundred millimeters; and
    forming an outer jacket over the buffer tube.

18. The method of claim 17, wherein loosely positioning discrete water swellable fibers within the buffer tube comprises air blowing the water swellable fibers into the buffer tube.

19. The method of claim 17, wherein loosely positioning discrete water swellable fibers within the buffer tube comprises extruding the water swellable fibers onto the at least one optical fiber prior to forming the buffer tube.

20. The method of claim 17, wherein loosely positioning discrete water swellable fibers within the buffer tube comprises applying the water swellable fibers to the at least one optical fiber by at least one of physical contact or electrostatic attraction prior to forming the buffer tube.

* * * * *